(12) United States Patent
Akasawa

(10) Patent No.: US 6,795,116 B1
(45) Date of Patent: Sep. 21, 2004

(54) IMAGE PROCESSING APPARATUS

(75) Inventor: Mitsuyuki Akasawa, Fussa (JP)

(73) Assignee: Casio Computer Co., Ltd., Tokyo (JP)

(*) Notice: Subject to any disclaimer, the term of this patent is extended or adjusted under 35 U.S.C. 154(b) by 0 days.

(21) Appl. No.: 09/250,088

(22) Filed: Feb. 16, 1999

(30) Foreign Application Priority Data

Feb. 18, 1998 (JP) .......................................... 10-052962

(51) Int. Cl.⁷ .............................................. H04N 5/262
(52) U.S. Cl. ................................ 348/231.6; 348/220.1; 348/239
(58) Field of Search ........................ 348/207.99, 222.1, 348/231.99, 231.3, 231.6, 231.9, 333.01, 333.11, 36, 218.1, 220.1, 39, 239; 358/906

(56) References Cited

U.S. PATENT DOCUMENTS

| | | | | |
|---|---|---|---|---|
| 4,827,347 A | * | 5/1989 | Bell | ........................ 348/333.05 |
| 5,043,816 A | * | 8/1991 | Nakano et al. | ........ 348/333.01 |
| 5,262,867 A | * | 11/1993 | Kojima | ........................ 348/39 |
| 6,552,744 B2 | * | 4/2003 | Chen | |

FOREIGN PATENT DOCUMENTS

| | | |
|---|---|---|
| EP | 0 533 108 A | 3/1993 |
| EP | 0 647 057 A | 4/1995 |
| EP | 0 649 244 A | 4/1995 |
| WO | WO 86/01631 | 3/1986 |

* cited by examiner

*Primary Examiner*—Tuan Ho
(74) *Attorney, Agent, or Firm*—Frishauf, Holtz, Goodman & Chick, P.C.

(57) ABSTRACT

An image processing apparatus is provided which includes a group automatically-registering unit or a group setting unit, and a grouping unit. At the time of taking photographs, the group automatically-registering unit groups images automatically, and then registers the stored address and group identifying information thereof in the group information list. At the time of taking photographs or reproducing images, the group setting unit groups images and/or images with the corresponding input data with aid of a user operation, and then registers the stored address and the size of images constituting the group or data, and the group identifying information thereon in a group information list. The grouping unit performs group-movement (insertion or deletion), change in reproducing order, transmission of recorded data, image print, display and the like in a group unit at the time of reproducing images.

7 Claims, 11 Drawing Sheets

FIG.2

| DATA ADDRESS | PROCESSING DATE AND TIME | INDIVIDUAL PHOTOGRAPHY | CONTINUOUS PHOTOGRAPHY | PANORAMIC PHOTOGRAPHY | CLOSE-UP PHOTOGRAPHY | GROUP INPUT | | |
|---|---|---|---|---|---|---|---|---|
| | | | | | | 67-1 | 67-2 | 67-3 |
| 1 | 98.1.10 | | 1 | | | 1 | 15 | |
| 2 | 98.1.10 | | 1 | | | 1 | 15 | |
| 3 | 98.1.10 | | 1 | | | 1 | 15 | |
| ---- | ---- | | 1 | | | ---- | | |
| 32 | 98.1.10 | | 1 | | | 1 | 15 | |
| 33 | 98.1.15 | 2 | | | | | 15 | 17 |
| 34 | 98.1.18 | 3 | | | | | | 17 |
| 45 | 98.1.20 | | | 4 | | | | |
| 46 | 98.1.20 | | | 4 | | | | |
| 47 | 98.1.20 | | | 4 | | | | |
| n | 98.1.25 | | | | | 1 | | |

60 — 61 — 62 — 63 — 64 — 65 — 66 — 67

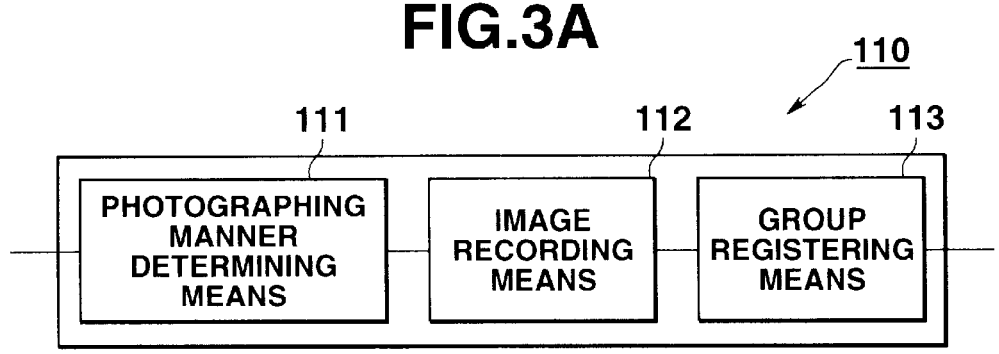
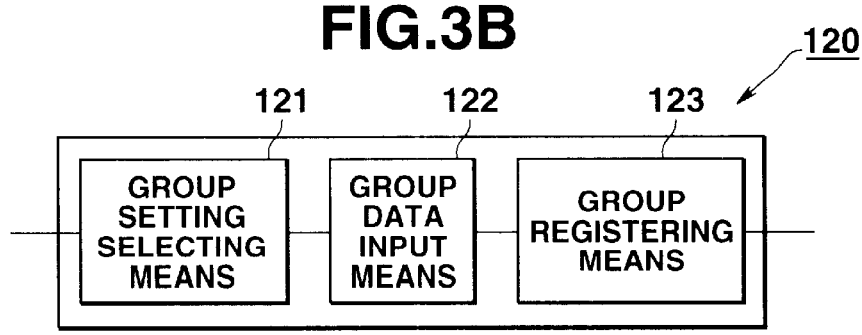
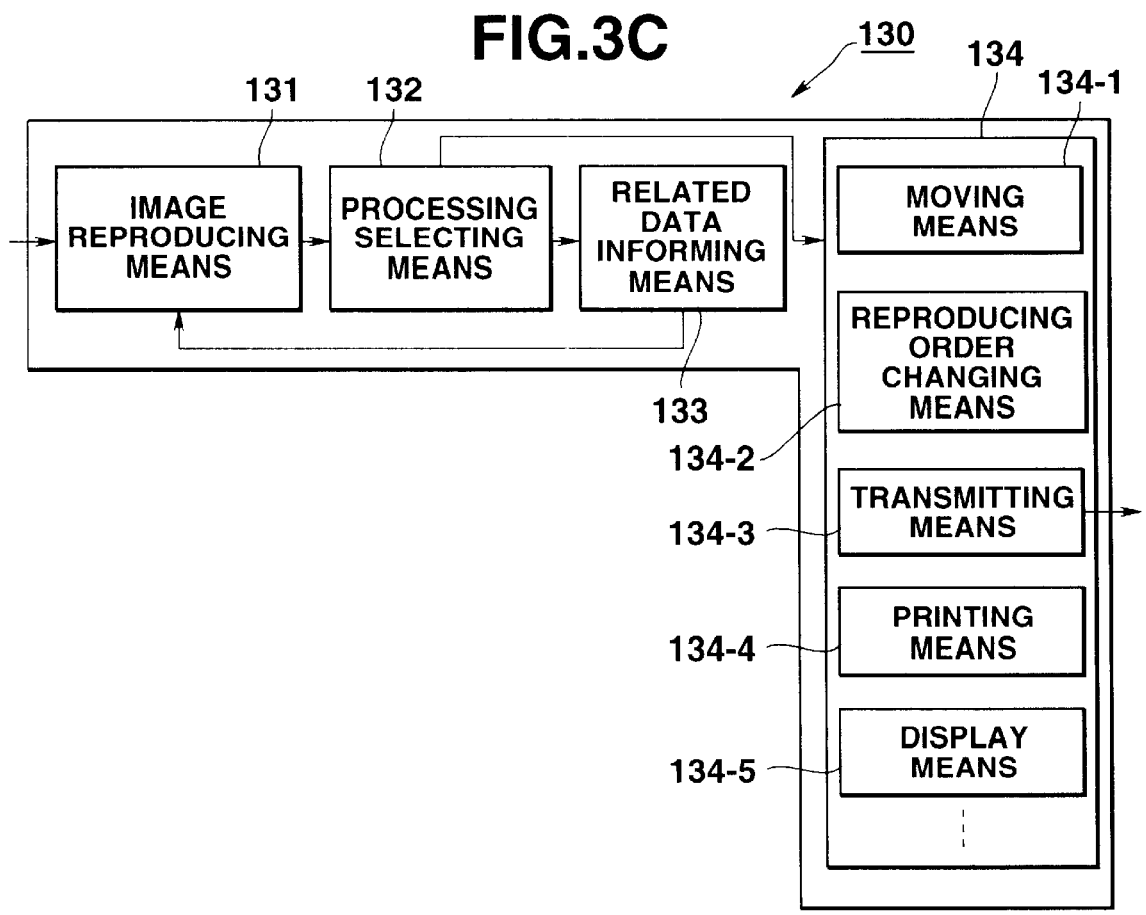

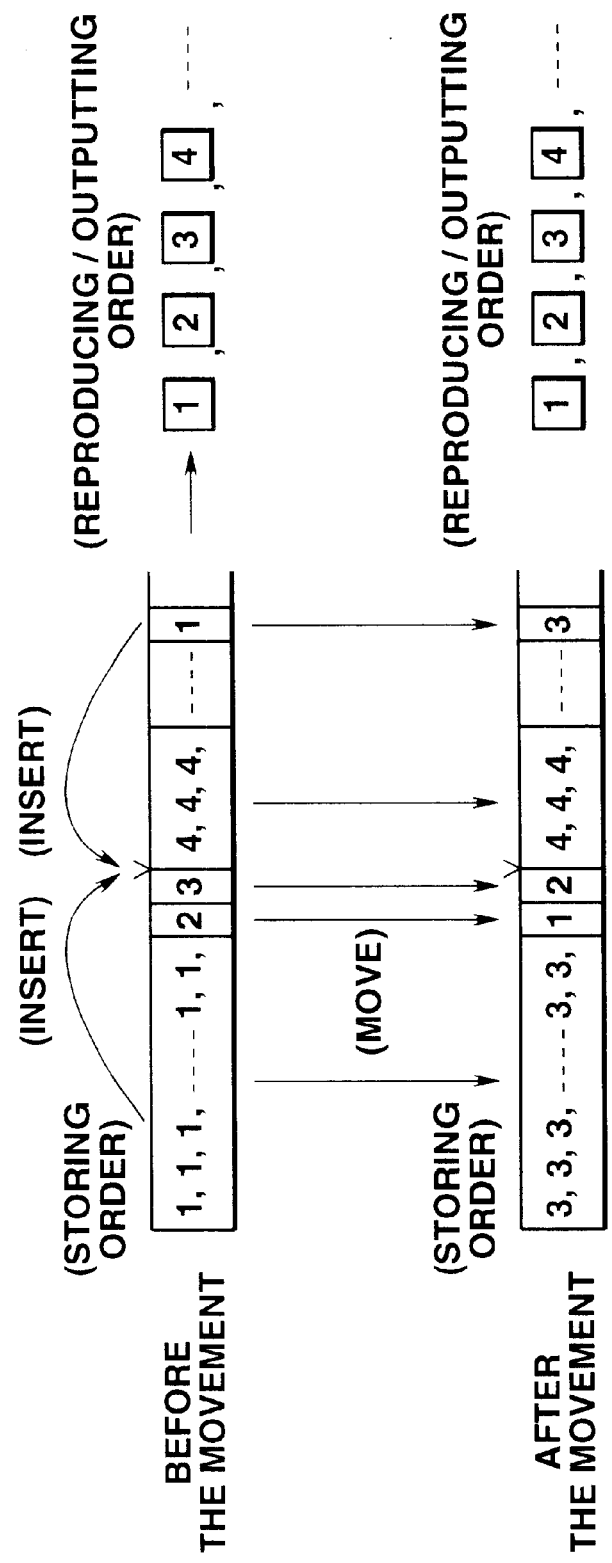

FIG. 9

| DATA ADDRESS 61 | PROCESSING DATE AND TIME 62 | INDIVIDUAL PHOTOGRAPHY 63 | CONTINUOUS PHOTOGRAPHY 64 | PANORAMIC PHOTOGRAPHY 65 | CLOSE-UP PHOTOGRAPHY 66 | GROUP INPUT 67 | | | REPRODUCING ORDER 68 |
|---|---|---|---|---|---|---|---|---|---|
| | | | | | | 67-1 | 67-2 | 67-3 | |
| 1 | 98.1.10 | | 3 | | | 3 | 15 | | 3 |
| 2 | 98.1.10 | | 3 | | | 3 | 15 | | 3 |
| 3 | 98.1.10 | | 3 | | | 3 | 15 | | 3 |
| --- | --- | | --- | | | --- | | | |
| 32 | 98.1.10 | | 3 | | | 3 | 15 | | 3 |
| 33 | 98.1.15 | 1 | | | | | | 17 | 1 |
| 34 | 98.1.18 | 2 | | | | | 15 | 17 | 1 |
| 45 | 98.1.20 | | | 4 | | | | | 2 |
| 46 | 98.1.20 | | | 4 | | | | | 2 |
| 47 | 98.1.20 | | | 4 | | | | | 2 |
| n | 98.1.25 | | | | | 3 | | | 3 |

60'

IMAGE PROCESSING APPARATUS

BACKGROUND OF THE INVENTION

The present invention relates to an image processing apparatus and an image processing method.

In image processing apparatus such as a digital camera, images of a photographed object are recorded/stored on a recording medium in order of taking the photographs. Therefore, in the case that a means for changing display order is not set up, the images are reproduced and displayed in order of taking the photographs or vice verse.

Hitherto, the order of reproducing recorded images has been changed by designating images individually and inserting, between certain images, other image. Among digital cameras, however, cameras have been sold which have various modes such as a continuous photography mode and a panoramic photography mode, as well as a normal mode in which images are photographed/recorded in an individual image unit.

In such cameras, according to the conventional method of changing reproducing order for individual images a part of images obtained by taking photographs continuously or by taking panoramic photographs may be inconveniently moved. As a result, there remains a problem that relevant images are dispersed.

BRIEF SUMMARY OF THE INVENTION

According to a first aspect of the present invention, an image processing apparatus comprises: storing section for storing plural photographic images; instructing section for instructing a desired photographic image among the photographic images stored in the storing section to be subjected to an image processing; and control section for performing the image processing of an photographic image relevant to the photographic image which is instructed to be subjected to the image processing by the instructing section.

When a desired photographic image is instructed to be subjected to the image processing, the photographic image relevant to the instructed photographic image is also subjected to the same image processing. Accordingly, according to this image processing apparatus, it is possible to prevent an inconvenience that relevant images, for example, images that are continuously or panoramically photographed, are processed separately.

According to a second aspect of the present invention, an image processing apparatus comprises: storing section for storing plural photographic images; instructing section for instructing a desired photographic image among the photographic images stored in the storing section to be subjected to an image processing; determining section for determining whether or not a photographic image relevant to the photographic image which is instructed to be subjected to the image processing by the instructing section is stored in the storing section; and informing section for informing, if the determining section determines that the relevant photographic image is stored, this fact.

When a desired image is instructed to be subjected to the image processing, it is determined whether or not the photographic image relevant to the photographic image instructed to be subjected to an image processing is stored in the storing section. When the determining section determines that the relevant photographic image is stored, this fact is informed. Thus, an undesired operation can be prevented.

According to a third aspect of the present invention, an image processing method comprises the steps of: instructing an image stored relevantly to other image to be subjected to an image processing; and performing the image processing by the instruction and the image processing of a photographic image relevant to the image subjected to the image processing.

According to this image processing method, when a desired photographic image is instructed to be subjected to the image processing, the photographic image relevant to the instructed photographic image is also subjected to the same image processing. Accordingly, according to this image processing apparatus, it is possible to prevent an inconvenience that relevant images, for example, images that are continuously or panoramically photographed, are processed separately.

According to a fourth aspect of the present invention, an image processing apparatus comprises: a memory for storing plural photographic images; an input key for instructing by a user a desired photographic image among the photographic images stored in the memory to be subjected to an image processing; determining section for determining whether or not a photographic image relevant to the photographic image which is instructed to be subjected to the image processing by the input key is stored in the memory; and informing section for informing, if the determining section determines that the relevant photographic image is stored, this fact.

According to this image processing apparatus, when a desired image is instructed to be subjected to the image processing, it is determined whether or not the photographic image relevant to the photographic image instructed to be subjected to an image processing is stored in the storing means. When it is determined that the relevant photographic image is stored, this fact is informed. Thus, an undesired operation can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a view illustrating an example of the formation of a group information list;

FIGS. 3A to 3C are block diagrams illustrating examples of the structures of a grouping means and the like;

FIG. 8 is a view for explaining a group-moving manner;

FIG. 9 is a view illustrating an example of the formation of a group information list;

DETAILED DESCRIPTION OF THE INVENTION

Figure 1:
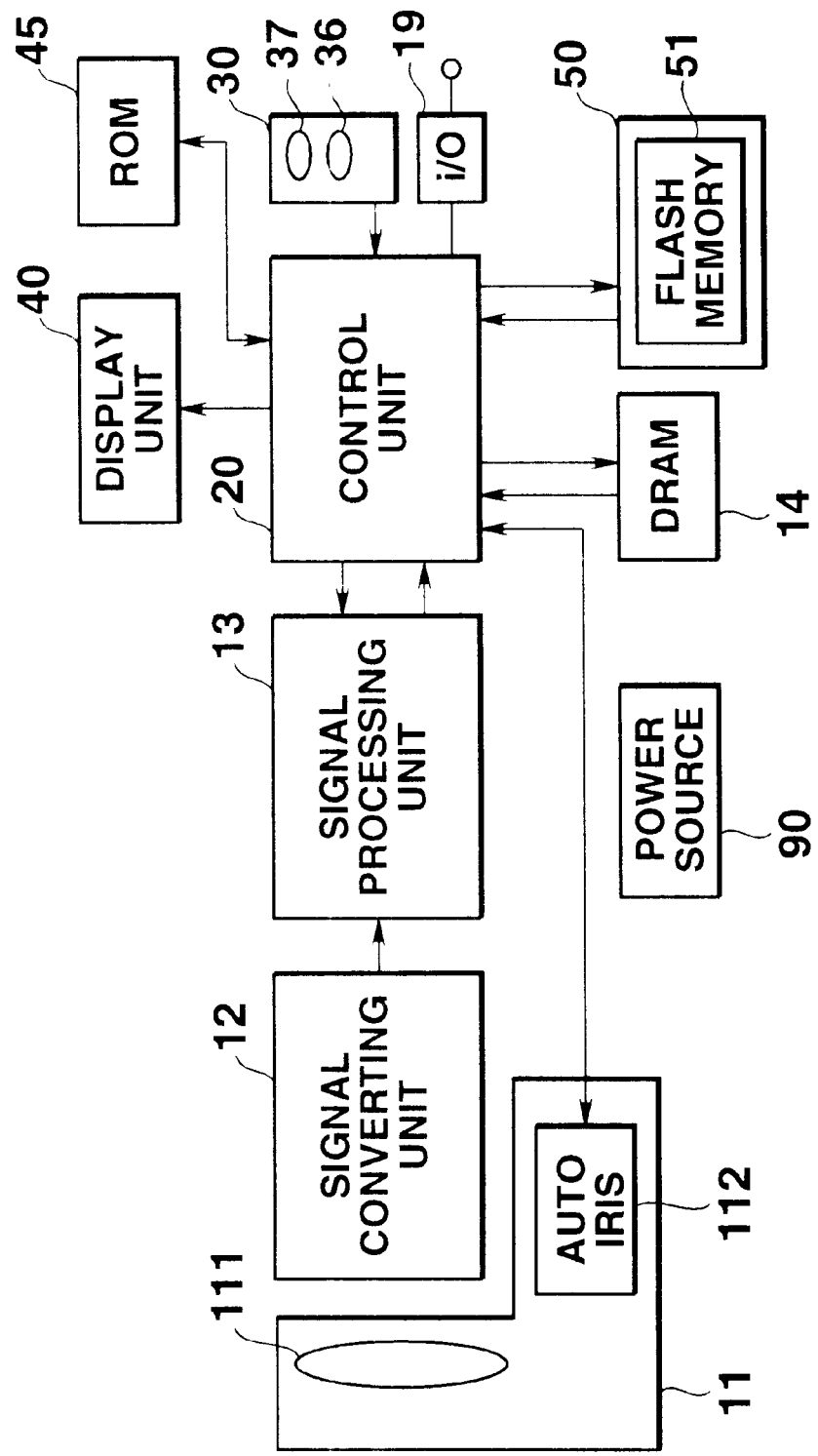
FIG. 1 is a block diagram illustrating an example of a circuit of a digital camera as an embodiment of the image processing apparatus according to the present invention.

FIG. 1 is a block diagram illustrating an example of a circuit of a digital camera (electrical still camera) as an embodiment of the image processing apparatus according to the present invention.

In FIG. 1, the digital camera 100 has an optical system 11, a signal converting unit 12, a signal processing unit 13, a DRAM 14, a serial interface 19, a control unit 20, an operation unit 30, a display unit 40, a ROM 45 for OSD data, a recording unit 50 and a power source 90.

In FIG. 1, the digital camera 100 may have a voice input/output unit such as a built-in microphone and a built-in speaker, and a voice store so that messages can be informed by voice output instead of display of messages or the like in the display unit 40. A touch panel comprising a transparent film to which touch electrodes are fitted may be disposed on a liquid crystal screen of the display unit 40, and the camera 100 may accordingly have a handwritten character input unit for inputting characters handwritten with a touch pen or the like, and a handwritten character recognizing unit for recognizing the read handwritten characters and outputting character codes.

The optical system 11 includes an image pickup lens 111 and an auto iris mechanism 112 and the like, and causes luminous flux, from an object, which is collected through the image pickup lens 111 to be focused, forming on image pickup elements (CCD) at the back.

The signal converting unit 12 includes CCD, a signal converting circuit and the like, and converts images formed on the CCD through the optical system 11 in the upstream into electric signals so as to output the electric signals as digital data in a constant cycle.

The signal processing unit 13 processes output from the signal converting unit 12 to gain signal components such as digital multiplex signals of brightness and color difference (YUV data), and then transfers the YUV data to a designated area in the DRAM 14 and develops the YUV data therein. Moreover, at the time of recording and storage the YUV data recorded in the DRAM 14 are read and are subjected to JPEG compression processing while at the time of reproduction the image data stored and recorded in a recording medium (flash memory) 51 are subjected to expansion processing so as to reproduce the YUV data.

The control unit 20 has a microprocessor structure including a CPU, a RAM, a ROM, a timer and the like. The CPU is connected to the above-mentioned respective circuits and a non-illustrated power source changing switch and the like through bus lines. The CPU controls the whole of the digital camera 100 according to a control program stored in the ROM, and performs and controls respective functions of the digital camera correspondingly to state signals from the operation unit 30, for example, performs an image group automatically-registering means, a group setting means 120 and a grouping means 130 and the like stored in the ROM to perform grouping of images and processing for each of the image groups, inform the existence of images belonging to the same group, and the like.

The operation unit 30 is composed of switches and buttons such as a processing mode changing switch, plural function selecting buttons, a main switch, a group-moving mode selecting button 36, a shutter button 37, and a recording/reproducing mode changing switch. When these switches or buttons are operated, state signals are sent out to the control unit 20.

The display unit 40 is composed of a display device such as a liquid crystal display device, so as to display an image of an object at the time of taking a photograph, a reproduction image at the time of reproduction, a selecting menu (or an icon) at the time of selecting a processing, and a group changing/setting menu (or an icon) at the time of displaying reproduction images. As described above, a touch panel made of a transparent film to which touch electrodes or the like are fitted may be disposed on the liquid crystal screen of the display unit 40 to input characters handwritten with a touch pen or the like.

The recording unit 50 records image data from the signal processing unit 13 on the recording medium (flash memory in this embodiment) 51.

The flash memory 51 has not only areas in which image data are recorded but also areas wherein recorded are an image data registering list for registering, at the time of recording image data, conditions for photographing the image and the like, and a group information list 60 (FIG. 2) in which grouping data for the image (and the data) are registered. The recording unit 50 registers the group number grouped by the image group registering means 110 in the group information list 60, and registers the images (and the data) grouped by the image group setting means 120 in the group information list 60. The image information registering list and the group information list 60 may be put in a single list.

In the case that the digital camera 100 has a voice input/output unit, another voice memory may be fitted thereto, or an area for recording voice data may be disposed in the flash memory 51. Moreover, the flash memory 51 may have an area for recording character data (including symbol data and icon data).

<Example of the Formation of the Group Information List>

FIG. 2 is a view illustrating an example of the formation of the group information list 60, which has a data address registering column 61, a processing data and time column 62, an individual photography column 63, a continuos photography column 64, a panoramic photography column 65, a close-up photography column 66, a group input column 67 and the like. In the list 60, grouping information for voice data and character data, as well as image data, can be registered.

In the data address registering column 61, the recording position (address) and size of not only image data but also voice data and character data can be registered. In the processing data and time column 62, the date when these data are registered or inputted is recorded.

From the individual photography column 63 to the group input column 67 are group information registering columns. Among these, from the individual photography column 63 to the close-up photography column 66 are for grouping-data decided according to a photography mode at the time of taking photographs. FIG. 2 illustrates 4 examples, that is, individual, continues, panoramic and close-up photography modes, but the photography modes are not limited to these examples, and are allowable if they can be grouped at the time of taking photographs.

In the individual photography column 63, the photographic order of images photographed in other mode than special photography modes such as continuous photography, panoramic photography and close-up photography modes, that is, in a normal photography mode is recorded as group identifying information (the group identifying information= the group number=the reproducing order number in this embodiment). In the example shown in FIG. 2, the group numbers "2" and "3" are assigned to images of the data addresses "33" and "34", respectively.

In the continuous photography column 64, the group number of continuously photographic images [images continuously photographed by releasing the shutter one time (In this embodiment, 32 frames of images are photographed by releasing the shutter one time)] is recorded. In the example shown in FIG. 2, the group number "1" is assigned to images of the data addresses "1" to "32".

In the panoramic photography column 65, recorded is the group number of a panoramic image that a view spreading out in the right and left directions or in the upper and lower directions is photographed to obtain plural images and then is cut and put together to display a single image. In the example shown in FIG. 2, the group number "4" is assigned to images of the data addresses "45" to "47".

In the close-up photography column 60, the group number of images photographed in the close-up photography mode and having the same theme is recorded.

The group input column 67 is a column for assigning group numbers to grouped image data, voice data or character data in the case that a user groups an image and another image, an image and data (voice data or character data), or data and other data according to a certain related matter. In FIG. 2, three columns 67-1 to 67-3 are arranged, but the number thereof is not limited to three. In the group input column 67-1 in the example shown in FIG. 2, the number of data to be combined is shown as the group number, and continuously photographic images "1" to "32" are related to the voice data "n". At the time of reproduction, therefore, the continuously photographic images "1" to "32" are displayed and additionally voice (explanation of the images, music or the like) is outputted from the built-in speaker. As for the group input columns 67-2 and 67-3, various combinations (for example, images photographed in a certain destination) are put together at will to set up a group number thereto for grouping.

The group-registered images are reproduced in order of the group number in this embodiment, but a reproducing order column may be separately set in the group information list 60 to manage group numbers and the reproducing order separately (FIG. 9).

<Module Structures of the Grouping Means and the Like>

FIGS. 3A to 3C are block diagrams illustrating examples of the structures of the grouping means and the like. FIGS. 3A, 3B and 3C illustrate structure examples of the image group automatically-registering means 110, the group setting means 120 and the grouping means 130, respectively.

Each of the above-mentioned means may be composed of a hardware circuit, but is realized by a program and is stored in the ROM (or the flash memory 51). Alternatively, it is allowable that a part of each of the above-mentioned means is composed of a hardware circuit and the other is realized by a program.

[Automatic Registration of an Image Group]

The image group automatically-registering means 110 is composed of a photographing manner determining means 111, an image recording means 112 and a group registering means 113, and groups images automatically at the time of taking photographs and then registers the stored address, size, date when the photographs are taken, and group identifying information (group numbers in this embodiment) in the group information list 60.

The photography mode determining means 111 examines a signal outputted when the user presses the selecting buttons or points an icon to select a suitable photography mode among, for example, the normal, continuous, panoramic and close-up photography modes, and then determines which of the photography modes is selected to store the result temporarily in the RAM of the control unit 20.

The image recording means 112 picks out image data of the photographic image from the DRAM 14 after the shutter button is pressed, causes the image data to be subjected to compression processing in the signal processing unit 13, and then records the image data in the flash memory 51. In this case, image numbers, date of photographing, photographing conditions and the like may be recorded in a non-illustrated image information list.

On the basis of the results which are temporarily stored in the RAM, the group registering means 113 decides in which column of the group information automatically-registering columns 63 to 66 of the group information list 60 group-registration is performed, attaches the same group number to the images photographed under the same photographing condition, and stores the stored address and data size of the images, the date of photographing and time, and the group number in the data address column 61, in the processing date and time column 62, and in the decided group information automatically-registering column, respectively.

In the example shown in FIG. 2, the stored address and size for each of continuously photographed 32 images, the date of photographing, and the group number "1" are stored in the data address column 61, in the date of photographing and time column 62, and in the continuous photography mode column 64, respectively. Concerning panoramically photographic images, the stored addresses and sizes for the respective images, the date of photographing and time, and the group number "4" are stored in the data address column 61, in the date of photographing and time column 62, and in the panoramic photography column 62, respectively. Moreover, concerning normally photographic images, their stored addresses and sizes, the date of photographing and time, and the group numbers "2" and "3" are stored in the data address column 61, in the date of photographing and time column 62, and in the individual photography column 62, respectively.

[Setting Groups by the User]

The group setting means 120 is composed of a group setting selecting means 121, a group data input means 122 and a group registering means 123, and groups, with aid of operation by the user, images and/or images with corresponding input data at the time of photographing or reproducing the images and then registers the stored address, the size, the date of photographing and time, the input date, the group identifying information (the group number in this embodiment) of the images or data which are members of the respective groups in the group information list 60.

The group setting selecting means 121 performs menu display, icon display, (voice message output or the like) for urging the user to carry out the operation as to whether or not the object image displayed after photographing the object is grouped, and then examines the result operated by the user (the state signal sent out by button operation designated with the menu, a display guide or the like, by pointing the icon, or the like).

At the time of reproducing images, the group setting selecting means 121 also performs menu display, icon display or the like as to whether or nor the reproduced images are newly grouped, and then examines the result by the user. In the case that the shutter button 37 is pressed at the time of photographing the images or an image forwarding button is pressed at the time of reproducing the images, grouping is not performed.

Figure 4:
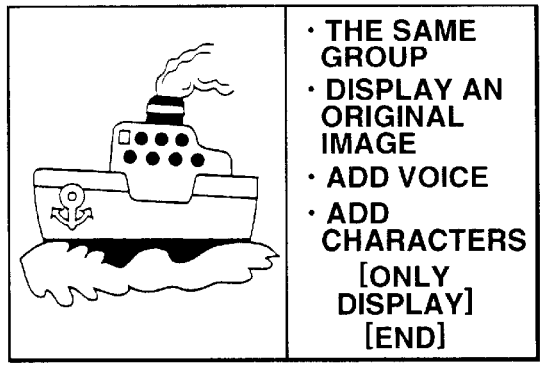
FIG. 4 is a view illustrating an example of a group setting selecting menu screen.

In the case that the operation result stored in the RAM means that grouping is performed, the group setting selecting means 121 displays a group setting selecting menu, (an icon or the like) as shown in FIG. 4 to urge selection by the user. In FIG. 4, a photographic image or reproduced image is combined with the menu, but the menu (or icon) may be displayed in another screen.

In the example shown in FIG. 4, a display screen displays the menus "the same group", "display an original image", "add voice", "add characters" and "end grouping". However, menus to be displayed are not limited to these menus.

The menu "the same group" means that images (including the displayed image) photographed (or reproduced) hereafter belong to the same group and these images are included in a different group from the group of images up to the selection of this menu (previous images).

The menu "display an original image" means that in the case that the user would like a displayed image to be included in the same group in which images transited to and already recorded in the group data input means are included, the recorded images are scaled down to be displayed together with the displayed image.

The menu "add voice" is displayed in the case that in the circuit shown in FIG. 1 the voice input/output unit is added to the digital camera 100, and means that voice input or voice data registered in the ROM 45 or the voice memory are caused to be included in the same group in which the displayed image is included.

The menu "add characters" is displayed in the case that in the circuit shown in FIG. 1 the handwritten character input unit and the character recognizing unit are added to the digital camera 100 in order that the user can input a character message or the like, and means that the character message or the like inputted by the user is caused to be included in the same group in which the displayed image is included.

When the menu "end grouping" is selected, it is meant that a series of grouping is ended, and the screen again displays the menus "the same group", "display an original image", "add voice", "add characters" and "end grouping".

At this time, if the menu "end grouping" is again pressed or the shutter button 37 or the reproduction image forwarding button is merely operated, non-grouping is regarded.

The group data input means 122 has a scaling-down means for scaling down recorded images and reproducing them and a display means for displaying the scaled-down images together, each of which is not illustrated. The group data input means 122 displays an input guide corresponding to each grouping manner selected by the group selecting means 121 so as to urge the user to input grouping data, and then stores the input data temporarily in the RAM. For example, in the case that the menu "the same group" is selected in FIG. 4, the group data input means 122 displays a group number, and the symbols "+" and "−", as shown in FIG. 5A, so that a suitable group number can be inputted.

Figure 5A:
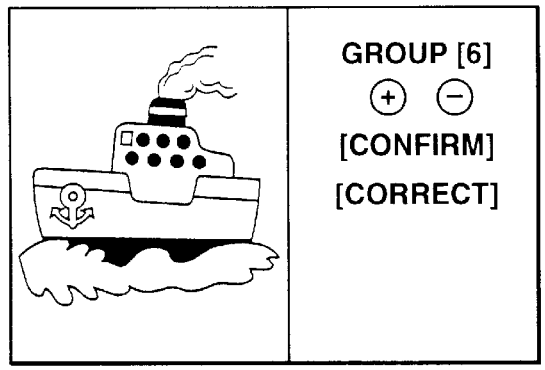
FIGS. 5A to 5D are views illustrating an example of a group data input screen.

In the example shown in FIG. 5A, the group number "6" is displayed. Thus, if the user presses a confirming button (for example, a function button) or points the displayed group number "6", the group number of the displayed image is inputted as "6". When the symbol "+" is pointed, the group number increases one by one. On the other hand, when the symbol "−" is pointed, the group number decreases one by one. Thus, if the user inputs the confirmation button when a desired group number is displayed, the user can input the group number of the image as the desired number. Moreover, if the displayed group number, for example, "1" is pointed, the user can input the group number of the image as "1".

Instead of the user's input, for example, a group number which is not used may be automatically assigned.

Without group numbers being inputted for respective images, it is allowable that at the start of photography (or reproduction) a group number is once automatically or manually assigned and then the same group number is assigned to images or the like photographed (or reproduced) thereafter.

Figure 5B:
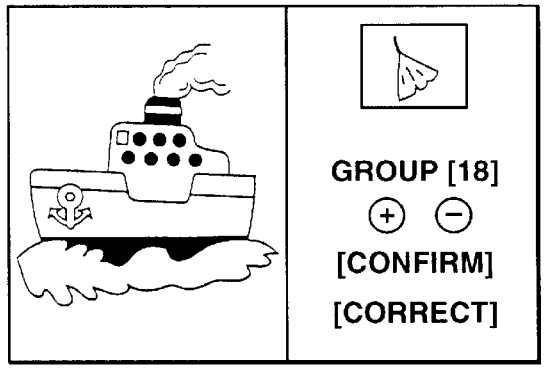

In the case that the menu "display an original image" is selected, the group data input means 122 scales down images recorded in the flash memory 51 to reproduce the image as shown in FIG. 5B, and displays the symbols "+" and "−" and, if the recorded images have a group number, the group number, together with the presently-displayed image.

In the case that the user would like the presently-displayed image to belong to the group of the recorded images or to be grouped into the recorded images and that the image number of the group is unclear, the symbol "+" or "−" is pointed so that the scaled-down images can be quickly forwarded and displayed to search the recorded images of the target group. When a desired scaled-down image is displayed, the scaled-down image can be pointed to input the group number of the scaled-down image as the group number of the displayed image.

Figure 5C:
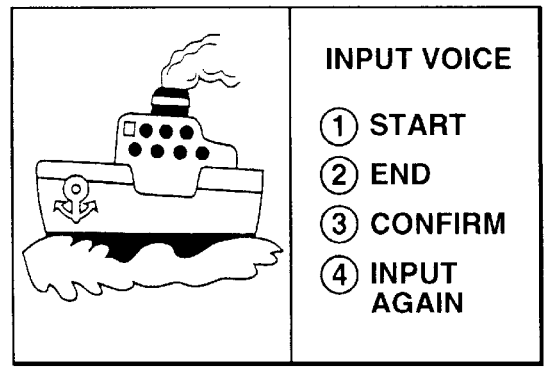

In the case that the menu "add voice" is selected, the group data input means 122 displays a message for urging the user to input voice as shown in FIG. 5C. The user can point the display guide "start", "end", "confirm", "input again", "OK" or the like to perform the start, end, confirmation, repeated input, final confirmation or the like of the voice input.

The input voice is converted into voice data to store the data in the voice memory or the voice data recording area of the flash memory 51. Additionally, the memory position and the group number (=the group number of the displayed image) of the voice data are temporarily stored in the RAM.

Figure 5D:
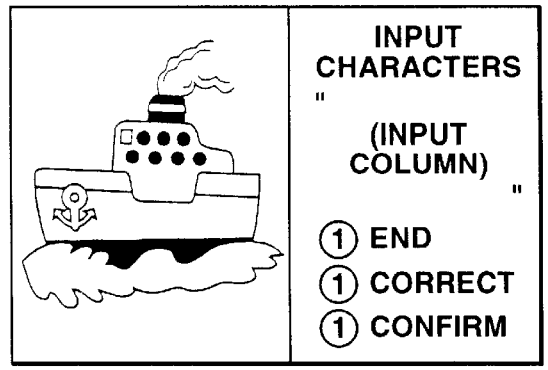

In the case that the menu "add characters" is selected, the group data input means 122 displays a message for urging the user to input a character message as shown in FIG. 5D. The user can use an input pen or the like to input a character massage or the like in the input column on the screen. The inputted handwritten characters or the like are recognized so that a character code stream for them is stored in the character data recording area of the flash memory 51. Moreover, the storing position and the group number (=the group number of the displayed image of the character data is temporarily stored in the RAM. In FIG. 5D, the user can end the character input, correct the inputted character and perform page-exchange, in the case that the input column is insufficient, by pointing the display guide "end", "correct" or "continue".

The group registering means 123 registers, in the group information list 60, the group number inputted through the group input means 122 and temporarily recorded.

In this case, the group number stored in the RAM is registered the group input column 67 of the group information list 60 when the menu "the same group" or "display an original image" is selected. In the case that the displayed image is a recorded image which is not grouped at all (for example, a transmitted image) and the menu "the same group" or "display an original image" is selected, the storing position, the date of photographing, and the group number of the displayed image are registered in the data address column 61, the processing date and time column 62, and the group input column 67 of the group information list 60, respectively. (In this embodiment, other images than transmitted images are registered in the group information list 60 because, at the time of recording images, the images are automatically group-registered by the image group automatically-registering means 110.)

In the case that the menu "add voice" or "add characters" is selected, the storing position, the input date and time and the group number of the voice data or the character data stored in the RAM are registered in the data address column 61, the processing date and time column 62 and the group input column 67 of the group information list 60, respectively.

[Grouping]

The grouping means 130 is composed of an image reproducing means 131, a processing selecting means 132, a related data informing means 133 and a grouping performing means 134, and performs movement (insertion and removal), change of reproducing order, transmission of recorded data, print of images, display and the like in each group unit at the time of reproduction. In this case, if there are images belonging to the same group, the existence of them is informed to the user by a voice message, a character message, icon display or the like.

Figure 6A:
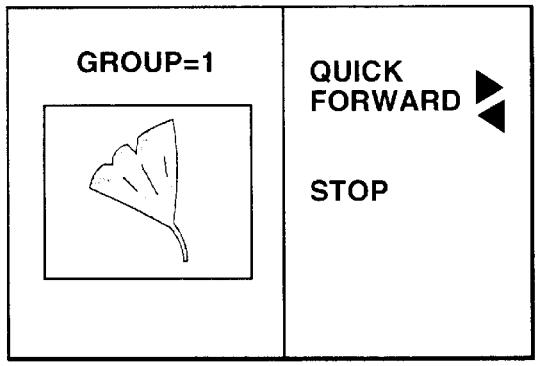
FIGS. 6A to 6C are views illustrating an example of a grouping selecting screen.

The image reproducing means 131 reproduces the data recorded in the flash memory 51, in the same way as image-reproduction in the normal mode, to display images on the screen of the display unit 40 in the case that the grouping mode is selected. In order to make selection of images by the user easy, the image reproducing means 131 can also search the group information list 60 (in order of the group number in this embodiment), and display it with quick forward of it (FIG. 6A).

Figure 6B:
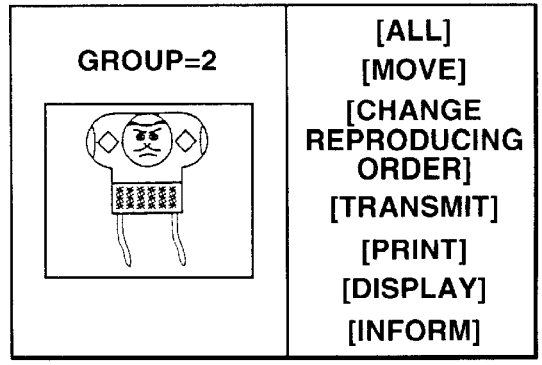

When a desired image is displayed, the processing selecting means 132 displays a processing selecting guide (menu) together with the desired image to urge the user to select a processing (FIG. 6B). In this case, plural processings may be selected. In the example shown in FIG. 6B, if desired and necessary guides are pointed among the guides [move], [change reproducing order], [transmit], [print], and [display] in order to select plural processings, each of the corresponding processing flags is turned on (=1). If the user points the guide [inform], the present operation is transited to the step by the related data informing means 133. If the guide [all] is pointed, all processings ([move], [change reproducing order], [transmit], [print], and [display]) flags for a given group are turned on.

A: Informing of Related Data

Figure 6C:
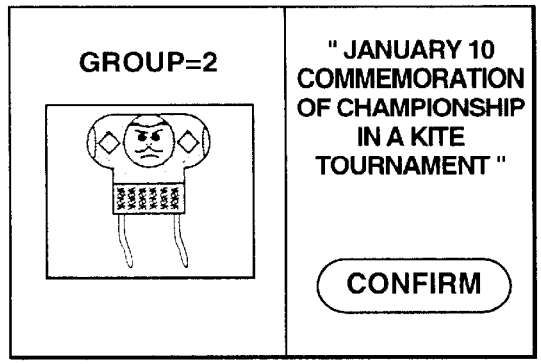

The related data informing means 133 searches the group information list 60 on the basis of the group number of the image displayed at present, and then informs, if the fact is found that there are images, voice data or character data having the same group number, the user of this fact by a voice or character message. In this case, the user can reproduce and watch the images of the same group in sequence, or reproduce the message to confirm the selected processing. When the confirmation of the informing, and the like (including non-confirmation) by the related data informing means 133 are finished, the operation is transited to the step by the grouping performing means 134 (FIG. 6C). In this embodiment the informing is performed when the user points the guide [informing] in the previous step, but automatic informing may be carried out at the time of selecting a processing (or displaying the desired image).

B: Grouping

The grouping performing means 134 has sub-modules such as a moving means 134-1, reproducing order changing means 134-5 and the like. After the confirmation by the related data informing means 133 is finished, a processing designated by the processing selecting means 132 is performed in the corresponding sub-module.

(1) Moving and Deleting The moving means 134-1 displays a movement instructing guide as shown in FIG. 7, together with a displayed image so as to urge the user to give instructions on a moving manner, a moving destination, and the like. By instructing movement or deletion of a desired image and the like, images etc. (meaning grouped images, and voice data or character data. This is the same hereinafter.) are moved or deleted in a group unit.

Group-moving (Inserting)

Figure 7A:
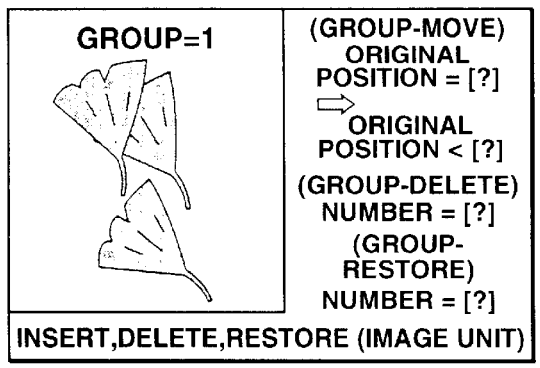
FIGS. 7A and 7B are views illustrating an example of a group selecting screen.
Figure 7B:
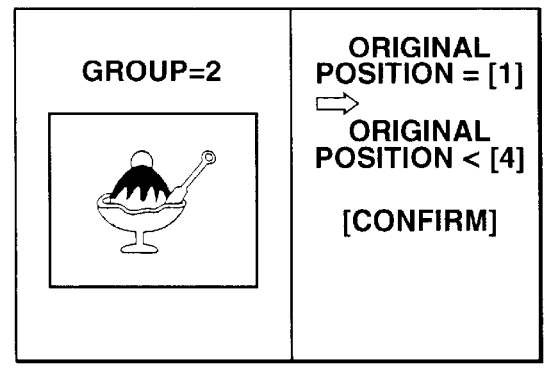

When the guide "group-move" is selected in the example shown in FIG. 7A, the group number of an image which is selected by the image reproducing means 131 and displayed at present and to which "moving" processing is instructed by the processing selecting means 132, that is, an image to be moved (an original position image) is displayed at the mark [?] of the "original position=[?]" (FIG. 7B). In the example shown in FIG. 7B, "original position =[1]" (continuously photographic images in the example shown in FIG. 2) is displayed.

In this case, the group number of the original position can again be set up by displaying images in order of their group numbers and selecting a desired image.

Next, image display is performed in order of their group numbers if the symbol "→" is pointed. Thus, in the case that there is a position where the user would like to move the original image, the user points the symbol "destination <[?]" of the image (the group number "4") displayed next to the above-mentioned position, the state of "original position [1]→ destination <[4]" arises. Thus, the images etc. of the group number "1" can be moved before the images of the group number "4", that is, between the images of the group numbers "3" and "4", and further the groups of "3" or later can be renumbered.

In short, in the case that the images etc. of the same group in which the image to be moved is included are stored, they are together moved in a designated destination.

When the user knows the group number of the original position or the destination, the group number may directly be inputted in the [?]. In the example shown in FIG. 7A, in the case that the images etc. of the group number "1" are moved at last, the user sets the state of the "original position [1]→ destination [E]".

If in the example of the group information list 60 shown in FIG. 2 the state of the "original position [1]→ destination < [4]" is set, the control unit 20 logically moves the images etc. without physical movement by rewriting the group numbers "2", "3" and "1" into "1", "2" and "3", respectively, as shown in FIG. 8.

In this way, images are displayed in each group unit thereof and in order of the group numbers at the time of reproducing the images. At the time of outputting the images, the images are outputted in order of the group numbers. FIG. 9 shows the storing state on the group information list 60' for the group-moved images etc. In the example shown in FIG. 8, the groups numbers "2" and "3" in the individual photography column 62 shown in FIG. 2 are rewritten into "1" and "2", respectively, and the group number "1" in the continuous photography column is rewritten into "3". When the guide [confirm] is pointed in the screen shown in FIG. 7B, the moved group images are displayed.

Group-deleting

In the case that the user selects the guide [group-delete] in FIG. 7A, by inputting a group number or designating the displayed image, other images etc. of the same group in which the selected image is included, if any, can be deleted at a time. Concerning the group-deleted images etc., their previous group number is substituted by "0" on the group information list 60. Any images etc. having the group number "0" are not subjected to processing in a grouping mode so far as the guide [restore] in FIG. 7A is not designated.

Group-restoring

In the case that the guide [group-restore] in FIG. 7A is selected, the group-deleted images etc. and their group number are displayed/outputted. The user can automatically give the images a new image group number (that is, the final number which is not used) by pointing the mark [?] of the guide [number], and can process the restored images etc. in the grouping mode by storing it in the group information list 60. Moving (inserting), deleting and restoring in each image (or data) unit Moving (inserting), deleting and restoring in each image unit, which are not those in each group unit, can also be performed by pointing the guide "image unit" in FIG. 7A. In the case that the processing in an image unit is performed, the image group number of the image is substituted by "0" on the group information list 60. In the non-illustrated image information registering list, rewriting processing for the inserting, deleting, restoring or the like is performed.

(2) Change of Reproducing Order

The reproducing order changing means 134-2 is a means which functions in the case that the reproducing order column 68 is set to the group information list 60 as in the group information list 60' shown in FIG. 9. This means is selected in the case that only the reproducing order of images is changed without movement of the images. When the reproducing order is changed, the result of the change is stored in the reproducing order column 68.

Figure 10:
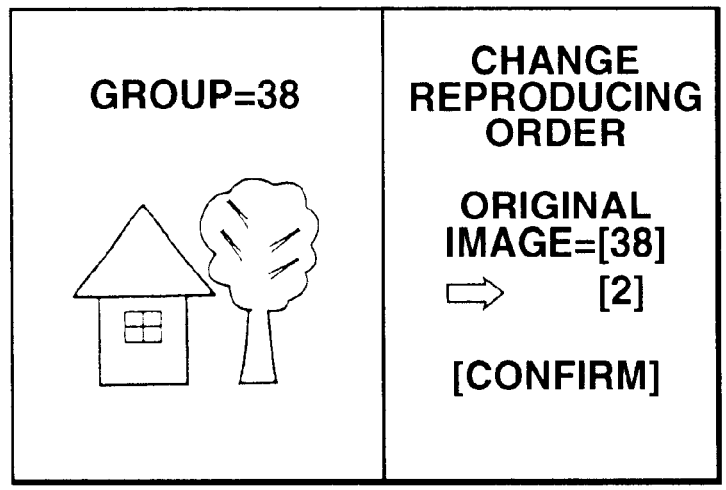
FIG. 10 is a view illustrating an example of a reproducing order changing screen.

When the user points, for example, the guide [change reproducing order] in the example shown in FIG. 10, group images are in turn displayed and the "group numbers" and reproducing order thereof are displayed. In the case that the user would like to change the "reproducing order", the user can change the reproducing order by inputting or designating desired reproducing order numbers. In the case that the reproducing order is not changed, the group numbers are equal to the reproducing order numbers. However, when the reproducing order numbers are changed, the reproducing order is automatically moved.

When the image of the reproducing order number "38" is changed to, e.g., the reproducing order number "2", the content in the reproducing order column 68 of the group information list is automatically changed as follows: "38"→"2", "2"→"3", "3"→"4" . . . "36"→"37", and "37"→"38". When the user points the guide [reset], the reproducing order is reset so as to be the same order as that of the group numbers.

The transmitting means 134-3 transmits data on images etc. belonging to the same group to an external device through the I/O interface 19.

The printing means 134-4 subjects image data on images belonging to the same group to expansion processing and processing for converting printing data, and then transmits the resultant data to a printer through the I/O interface 19 to perform color printing of images. The printing means 134-4 also makes it possible that the user designates the number of print sheets, a print size and the like.

The display means 134-5 reproduces images belonging to the same group and displays them on the display unit 40. If there are voice data belonging to the same group, the voice is reproduced to output a voice message. If there are character data belonging to the same group, a character message is displayed together with the reproduction image.

In the case that after a certain processing of the above-mentioned processings ends the processing flag for the processing is turned off (=0) and the processing flags for the other processings are on, the processing is automatically performed. Such action is repeated until all processing flags are turned off.

Not only transmission, printing and display in each group unit but also those in each image unit can be performed in the same way as the above-mentioned movement and deletion.

<Example of Operation>

Figure 11:
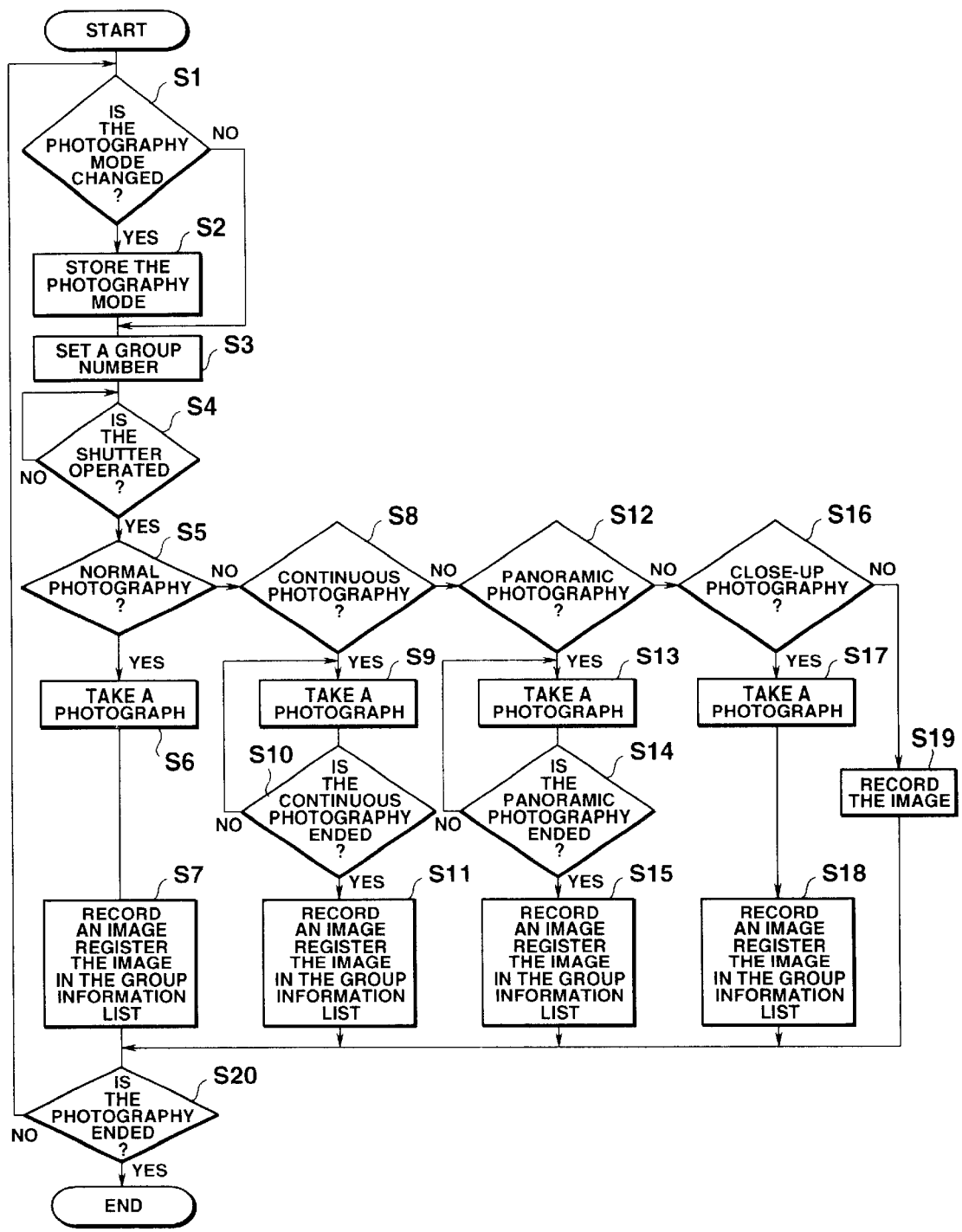
FIG. 11 is a flowchart of an example of operation at the time of registering an image group automatically.

(1) Example of operation at the time of registering an image group automatically FIG. 11 is a flowchart showing an example of operation at the time of registering an image group automatically.

In FIG. 11, the initial photography mode is set to the normal mode. The photography mode is examined, and if the photography mode is not changed, the operation is transited to the step S3 (S1). If it is changed, the photographing flag is set to a value corresponding to a new photography mode and the value is stored in the RAM (S2). Next, the number that "1" is added to the present group number is set as a new group number (S3).

When the shutter button is operated (S4), the value of the photographing flag stored in the RAM is examined (S5). In the case that it means the normal photography mode, a photography is taken to store an image data temporarily in the DRAM 14 (S6).

Next, the image data which is temporarily stored in the DRAM 14 is read and subjected to compression processing to record the data in the flash memory 51. Moreover, the stored address of the image data and the date of photographing in the flash memory 51, and the group number stored in the RAM are registered in the group information list 60, and then the operation is transited to the step S20 (S7).

In the case that the value of the photographing flag does not mean the normal photography but continuous photography mode in the step S5, photographing action is performed by the number of times of the continuous photography so as to temporarily store image data about frames photographed in sequence in DRAM 14 (S9 and S10). After the photographing action is performed by the number of times of the continuous photography, the following operation is repeated by the number of times of the continuous photography: the image data stored in the DRAM 14 are read one frame by one frame, subjected to data compression processing, and recorded in the flash memory 51; and in addition, the stored address and date of photographing of the image data in the flash memory 51, and the group number stored in the RAM are registered in the group information list 60. Thereafter, the operation is transited to the step S20 (S11).

In the case that the value of photographing flag does not mean the continues photography but panoramic photography mode in the step S8, photographing action is performed by the number of times of the panoramic photography so as to temporarily store image data about frames photographed in sequence in DRAM 14 (S13 and S14). After the photographing action is performed by the number of times of the panoramic photography, the following operation is repeated by the number of times of the panoramic photography: the image data stored in the DRAM 14 are recorded one frame by one frame, subjected to data compression processing, and recorded in the flash memory 51; and in addition, the stored address and date of photographing of the image data in the flash memory 51, and the group number stored in the RAM are registered in the group information list 60. Thereafter, the operation is transited to the step S20 (S15).

In the case that the value of the photographing flag does not mean the panoramic photography but close-up photography mode in the step S12, the image data temporarily stored in the DRAM 14 are read, subjected to data compression processing, and recorded in the flash memory 51. Moreover, the stored address and date of photographing of the image data in the flash memory 51, and the group number stored in the RAM are registered in the group information list 60. Thereafter, the operation is transited to the step S20 (S18).

In the case that the value of the photographing flag does not mean the close-up photography mode, the image data resulting from the photography are recorded in the flash memory 51, and then the operation is transited to the step S20 (S19). When the photography is wholly finished, the operation is finished. If not so, the operation is returned to the step S1 (S20).

(2) Example of operation when the user sets a group

Figure 12:
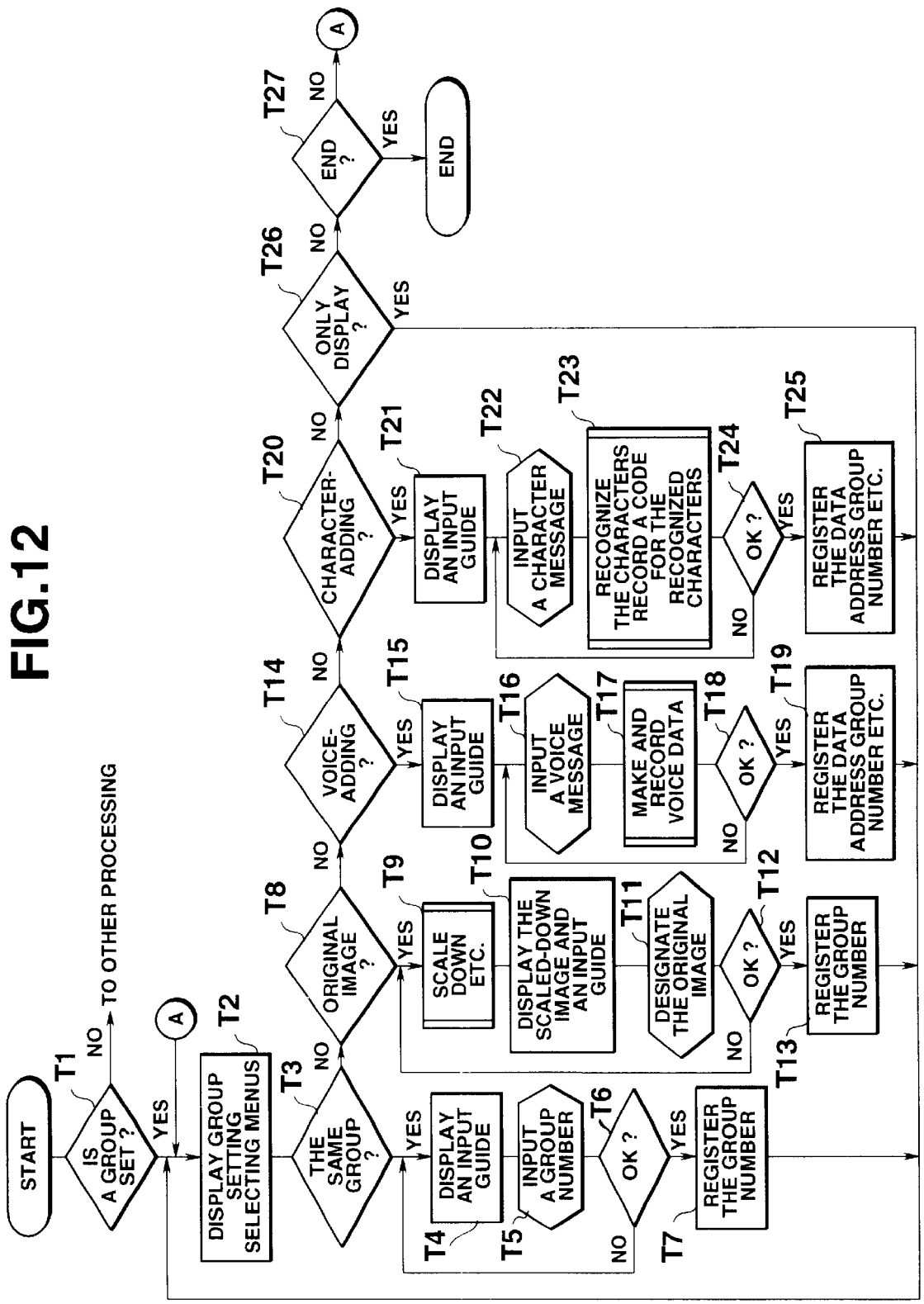
FIG. 12 is a flowchart of an example of operation when a user sets a group.

FIG. 12 is a flowchart showing an example of operation when the user sets a group.

When the group setting mode is selected after taking photographs or at the time of reproducing recorded images (T1), group selecting menus as shown in FIG. 4 are displayed on the screen for displaying the images, to urge the user to select a suitable menu (T2).

(Group-designating) The result of the selection by the user is examined. In the case that other than the guide "the same group" is designated, the operation is transited to the step T8 (T3). In the case that "the same group" is designated, input guides as shown in FIG. 5A are displayed to urge the user to designate a group number (T4).

At the time of pointing the group number of the presently-displayed image, the user points the number inside the parentheses [ ] ([6] in the example shown in FIG. 5A), while at the time when the user would like to change the group number to a desire number or would like the displayed image to belong to a group resulting from grouping which was already performed, the user points the symbol "+" or "−" and then points, if a desired number is displayed, the number (T5). When the user points the guide "correct", the operation is returned to the step T4 (T6). When the user points the guide [confirm], the pointed number is registered as a group number in the group information list. After the registration, the operations is returned to the step T2, and the program waits for designation of grouping the next image (T7).

(Search of an Original Image Candidate for Grouping)

In the case that the menu "the same group" is not designated in the step T3, it is examined whether the guide "original image" is designated or not. If not so, the operation is transited to the step T14 (TB). If the "original image" is designated, as shown in FIG. 5B the image data recorded in the flash memory 51 is subjected to expansion processing and subsequent scaling-down processing (T9). The scaled-down image is reproduced and then the symbols "+" and "−", together with, if any, the group number of the recorded images are displayed with the presently-displayed image (T10).

In the case that the user would like the presently-displayed image to belong to the recorded group images or to be grouped into the recorded images and its group number is unclear, the user points the symbol "+" or "−" to quickly forward and display the scaled-down images as an original image candidate. When a desired scaled-down image (=the original image) is displayed, the scaled-down image is pointed (T11). In the example shown in FIG. 5B, a scaled-down image of a leaf of a ginkgo having the group number [18] is displayed as the original image candidate.

When the user points the guide "correct", the processing is returned to the step T9 (T12). When the user points the guide [confirm], the pointed number is registered as the group number of the displayed image of a steamship in the group information list. The processing is returned to the step T2, and then the program waits for designation of grouping the next image (T13).

(Grouping a Voice Message)

In the case that the guide "original image" is not designated in the step T8, it is examined whether the menu "add voice" is designated or not. If not so, the operation is transited to the step T20 (T14). If the menu "add voice" is designated, the guide, menu or the like for urging input of a voice message is displayed (T15).

The user points the display guide "start", to input a voice message. When the voice input is finished, the user points the guide "end" (T16). The inputted voice is converted into voice data and stored in the voice recording area of the flash memory 51 (T17).

When the user points the guide "confirm", the inputted voice is reproduced. When the user points the guide "input again", the operation is returned to the step T16 (T18). When the user points the guide [OK], the stored address and input date of the voice data, and the group number of the voice data are registered in the group information list (the group number of the voice data =the group number of the presently-displayed image of the steamship). After the registration, the operation is returned to the step T2, and the program waits for designation of grouping the next image (T19).

(Grouping a Character Message)

In the case that the menu "add voice" is not designated in the step T14, it is examined whether the menu "add characters" is designated. If not so, the operation is transited to the step T26 (T20). If the menu "add characters" is designated or not, a guide, or menu or the like for urging input of a character message is displayed as shown in FIG. 5D (T21).

The user uses an input pen or the like in the input column on the screen to input a character message or the like (T22). When the guide [end] is pointed, handwritten characters or the like are recognized and then a character code stream for them is stored in the character data recording area of the flash memory 51. When the input column is insufficient for writing the message, the user can point the guide [continue] so as to continue to write the message from the upper of the input column (T23).

If the user points the guide "correct", the operation is returned to the step T22 (T24). If the user points the guide "end", the pointed number is registered as the group number of the displayed image of the steamship in the group information list. After the registration, the processing is returned to the step T2, and then the program waits for designation of grouping the next image (T25).

In the case that the menu "add characters" is not designated in the step T20, it is examined whether the guide "display" is designated or not. If the guide "display" is designated, the screen shown in FIG. 5A continues to be displayed. If the guide "display" is not designated, it is examined whether the guide "end" is designated or not. If the guide "end" is designated, the grouping is finished, and if it is not designated, the program waits for instruction input in the step T2 (S27).

If there is an image to which the same group number as the presently-displayed image is assigned in the case that the guide "display" is designated, they may be displayed in a multi-screen or scroll-displayed.

(3) Example of operation at the time of grouping

Figure 13:
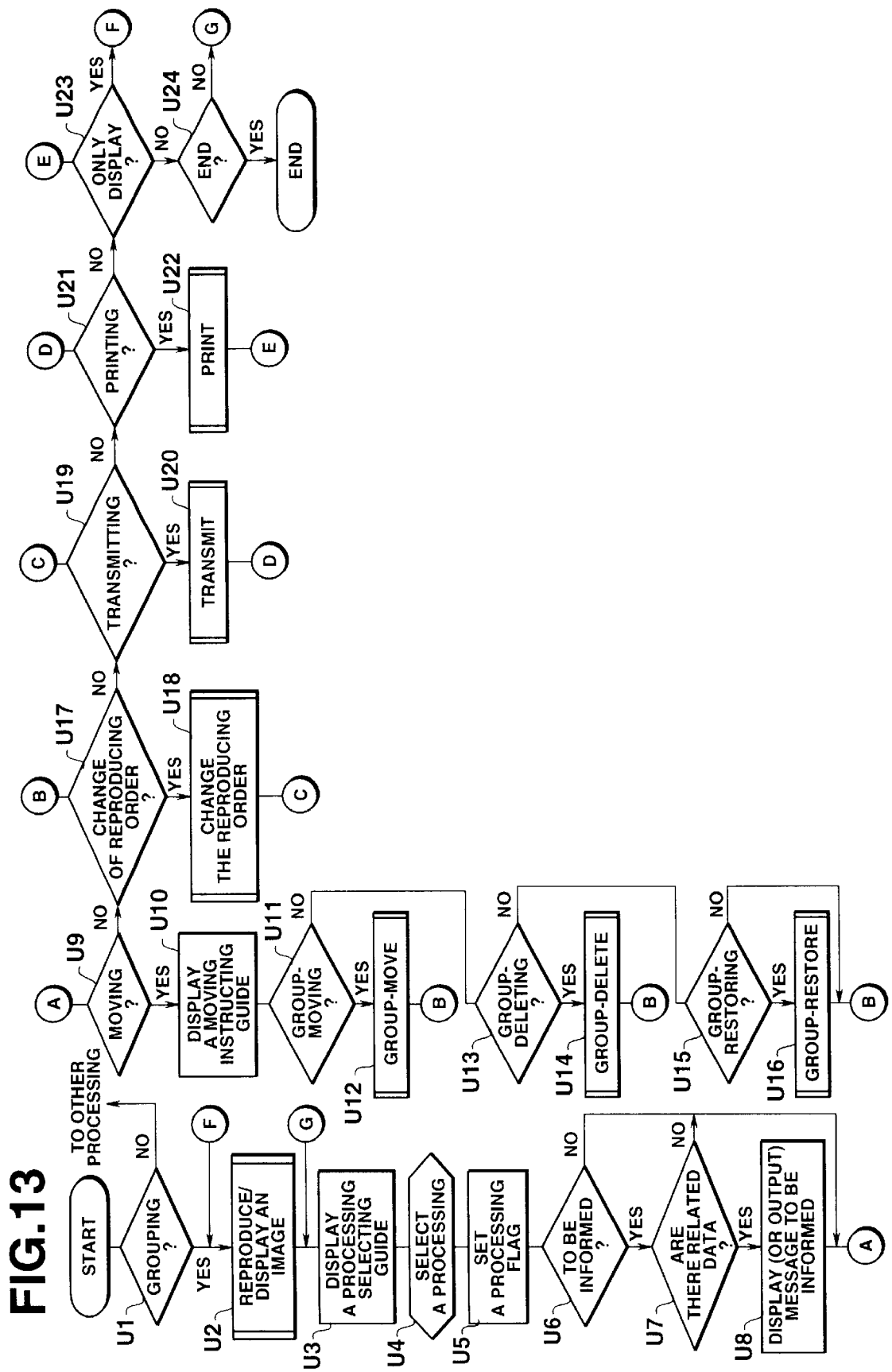
FIG. 13 is a flowchart illustrating an example of operation a the time of grouping.

FIG. 13 is a flowchart showing an example of operation at the time of grouping.

When the grouping mode is selected at the time of reproducing the recorded images (U1), the image data recorded in the flash memory 51 are reproduced and displayed as shown in FIG. 6A (U2).

If the stop of quick forward is pointed to select a desired image, a processing selecting guide as shown in FIG. 6B is displayed together with the displayed image, so as to urge the user to select grouping (U3). If the user points a desired processing or desired processings (U4), the corresponding processing flag or flags are turned on (U5). If the user points the guide [informing] (U6), the group information list 60' is examined. In the case that there is an image or data of the same group in which the presently-displayed image is included (U7), a message for informing the existence of the data is displayed by characters or outputted by voice, to inform the user of this fact. After the confirmation thereof, the operation is transited to the step U9 (U8).

If the value of the processing flag corresponding to moving processing is off, the operation is transited to the step U17 (U9). If the value of the processing flag is on, a movement-instructing guide as shown in FIG. 7A together with the displayed image are displayed to urge the user to instruct a moving manner, a moving destination or the like (U10).

When the guide [group-move] is selected (U11), the group number designated on the group information list is substituted by the group number of the designated moving destination and then the original group numbers are in turn substituted so that renumbering is performed. Thus, the images etc. are moved to desired positions in a group unit. After the confirmation thereof, the operation is transited to the step U17 (U12).

In the case that the guide [group-delete] is selected in the step U11 (U13), by inputting a group number or designating the displayed image the images etc. of the same group in which the image is included are deleted at a time. Concerning the group-deleted images etc., their previous group number is substituted by "0" on the group information list 60 (U14).

If the user selects the guide "group-restore" in the step U13 (U15), the group number of the group-deleted images etc. and these images etc. are displayed/outputted. When the user points the mark [?] of the [number] guide, a new image group is automatically given to the images and stored in the group information list 60 (U16).

In the case that the processing flag corresponding to the reproducing order changing processing is off, the operation is transited to the step U19 (U17). In the case that the processing flag is off, if the user inputs or designates a desired reproducing order number, the reproducing order of the group to which the displayed image belongs can be changed. When the reproducing order number is changed, the reproducing order is automatically moved. After the confirmation thereof, the operation is transited to the step U19 (U18).

In the case that the transmitting flag is off, the operation is transited to the step U21 (U19). In the case that this flag is on, if other images etc. belonging to the same group in which the displayed image is included, that is, other images etc. to which the same group number is assigned are stored, they together with the displayed image are transmitted to an external device through the I/O interface 19. After the transmission, the operation is transited to the step U21 (U20).

In the case that the printing flag is off, the operation is transited to the step U23 (U21). In the case that this flag is on, if there is other image data about an image belonging to the same group, it is together subjected to expansion processing and printing data converting processing, and then transmitted to the printer through the I/O interface 19 to perform color printing (U22).

In the case that the displaying flag is on, the operation is transited to the step U2 so that reproduction/display is performed (U23). In the case that this flag is off, it is examined whether grouping is ended or not. If the grouping is not ended, the operation is returned to the step U3 and the program waits for selection of a processing (U24).

In the above-mentioned embodiment, it is basic that in the case that a processing is designated for the reproduced/displayed image, if there is an image of the same group in which the displayed image is included, the processing is also for it. However, a processing (movement, print, transmission, deletion or the like) may be performed by designating a group (for example, inputting a group number) directly.

In the above-mentioned embodiment, the user sets groups to images. For example, however, in the case that the present invention is applied to an information receiving device or an information input device, if the user can set groups to received information or input information, the same advantages can be obtained.

The above has described an embodiment of the present invention, but the present invention is not limited to the above-mentioned embodiment, and can be carried out in various modified modes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus, comprising:

storing means for storing plural photographic images;

instructing means for selecting, by input by a user, plural desired photographic images from among the photographic images stored in the storing means, and for instructing a desired photographic image among the photographic images stored in the storing means to be subjected to an image processing; and control means for performing the same image processing of a photographic image relevant to the photographic image which is instructed to be subjected to the image processing by the instructing means;

wherein the relevant photographic image is one of the plural desired photographic images selected by the input of the user.

2. The image processing apparatus according to claim 1, wherein the image processing comprises one of a reproducing and display processing, a storing area moving processing, a reproducing order changing processing, a deleting processing, a processing for transmission to an external device, and printing processing.

3. An image processing apparatus, comprising:

a memory for storing plural photographic images;

an input device for inputting an instruction by a user; and a control section for:
   (i) selecting plural desired photographic images from among the photographic images stored in the memory by input by the user using the input device,
   (ii) establishing relevancy between the selected photographic images, and,
   (iii) when instructed from the input device to perform image processing of a desired photographic image stored in the memory, performing the image processing of the desired photographic image instructed by the input device and the same image processing of a photographic image relevant to the instructed photographic image.

4. The image processing apparatus according to claim 3, wherein the image processing comprises one of a reproducing and display processing, a storing area moving processing, a reproducing order changing processing, a deleting processing, a processing for transmission to an external device, and printing processing.

5. An image processing apparatus, comprising:

photography mode selecting means for selecting a photography mode from among plural photography modes;

storing means for storing plural photographic images;

group registering means for establishing relevancy between photographic images acquired in the same photography mode among the stored photographic images;

instructing means for instructing a desired photographic image among the stored photographic images to be subjected to an image processing; and control means for performing the same image processing of a photographic image which is relevant to the photographic image which is instructed to be subjected to the image processing by the instructing means.

6. The image processing apparatus according to claim 5, wherein the selected photography mode comprises a continuous photography mode and relevancy is established between plural images acquired in the continuous photography mode.

7. The image processing apparatus according to claim 5, wherein the selected photography mode comprises a panoramic photography mode and relevancy is established between plural images acquired in the panoramic photography mode.

* * * * *